Aug. 4, 1953　　　J. DUDA ET AL　　　2,647,525
APPARATUS FOR HARVESTING CROPS
Filed Dec. 11, 1950　　　　　　　　　　　6 Sheets-Sheet 3
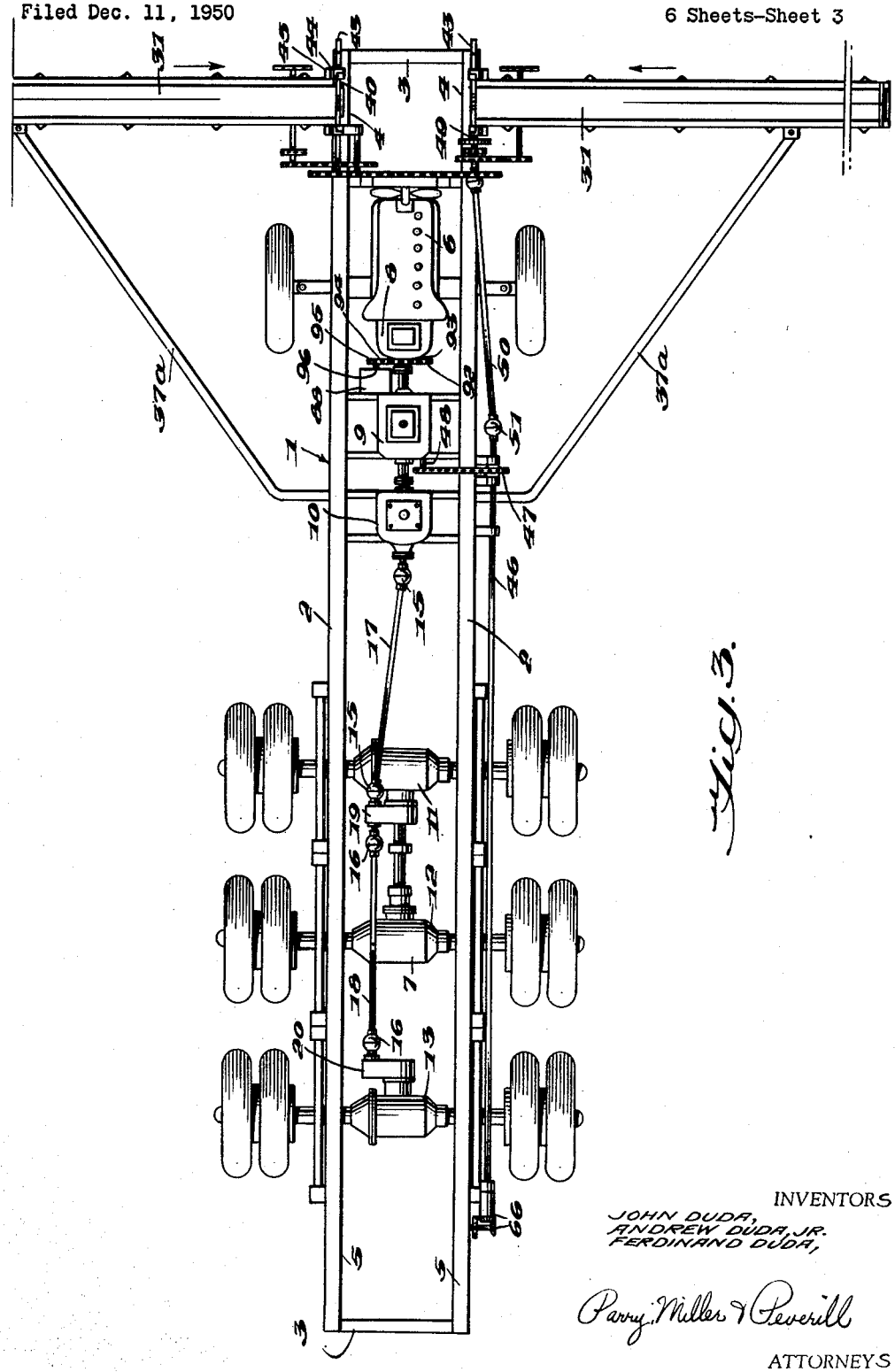
INVENTORS
JOHN DUDA,
ANDREW DUDA, JR.
FERDINAND DUDA,
ATTORNEYS

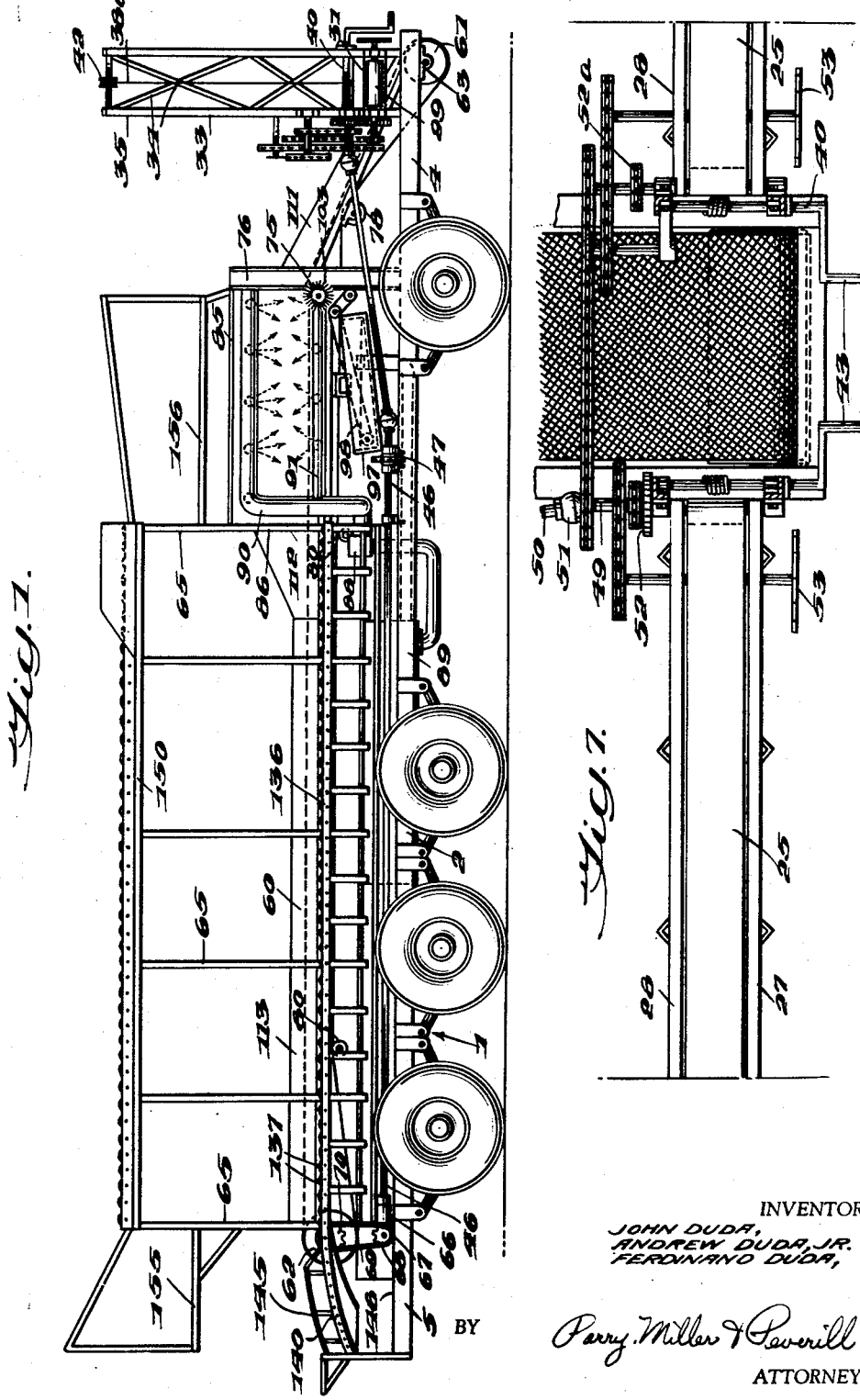

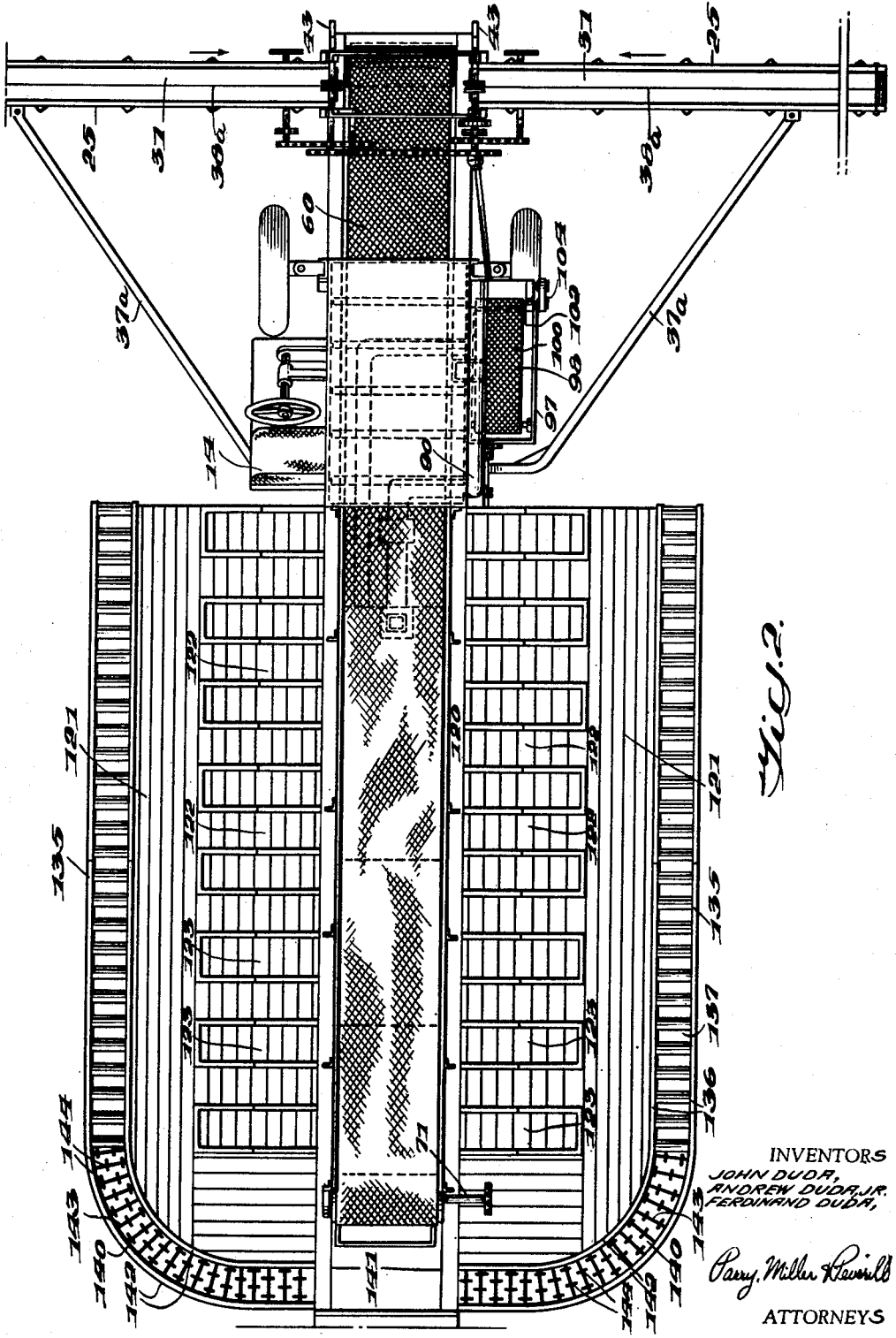

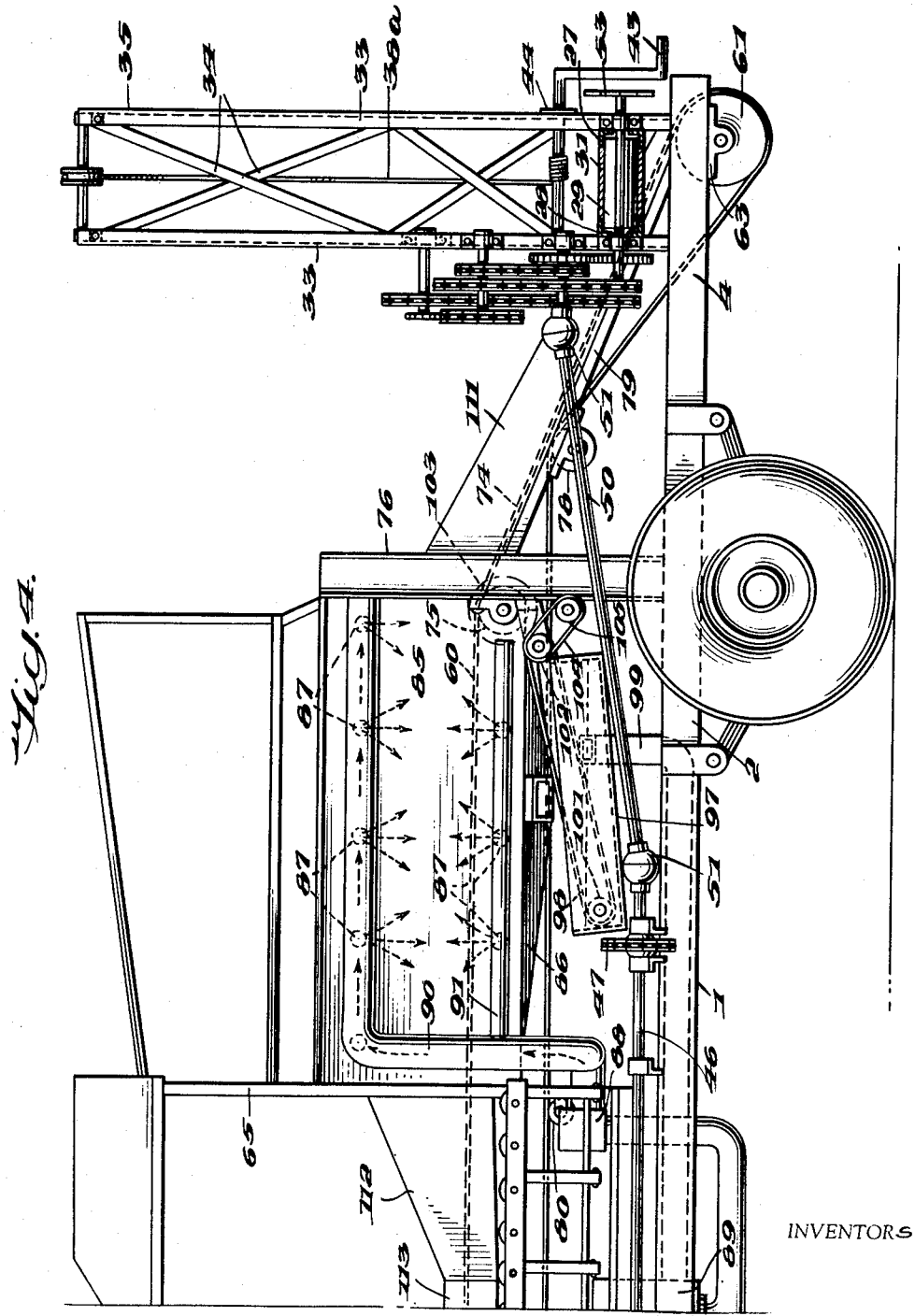

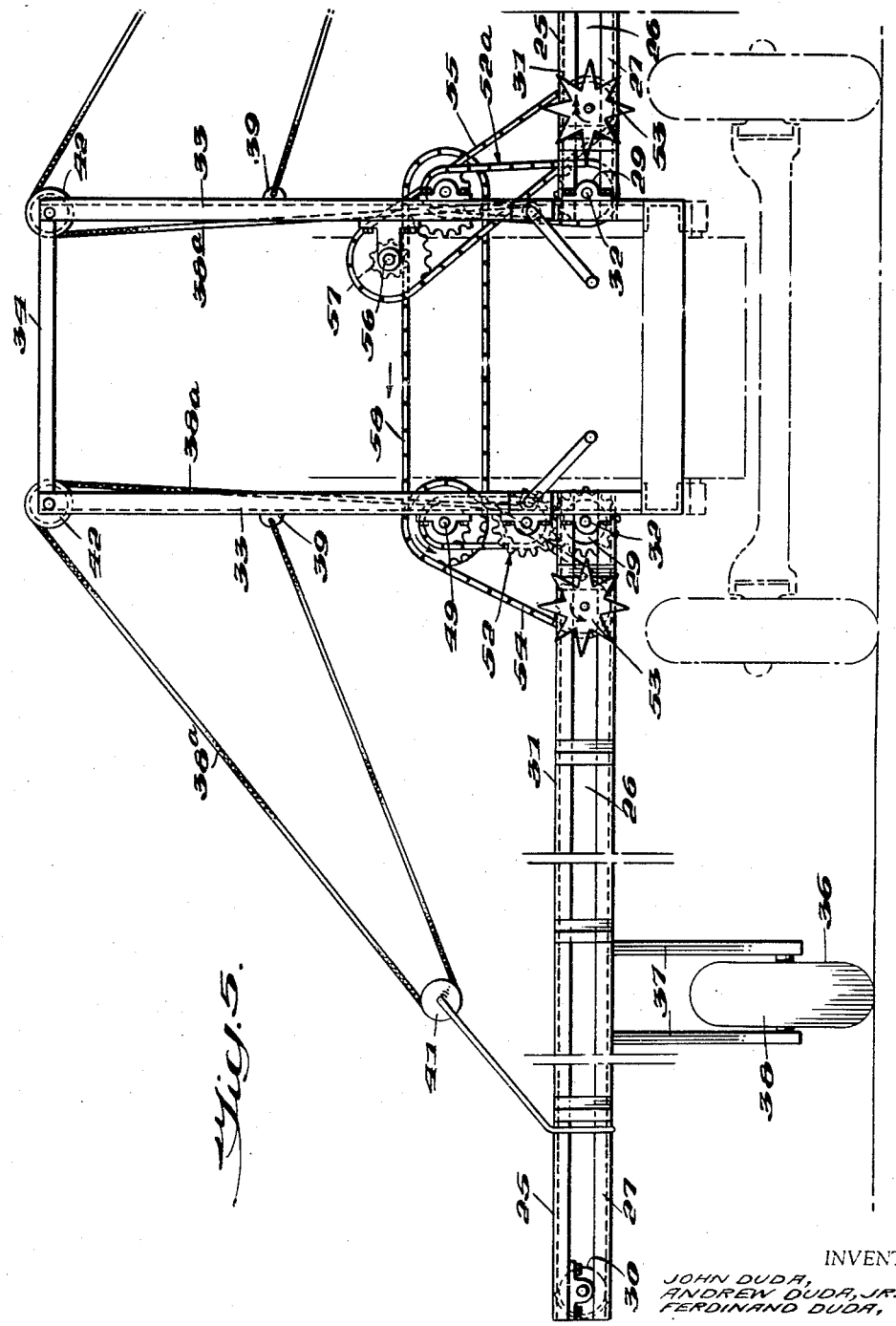

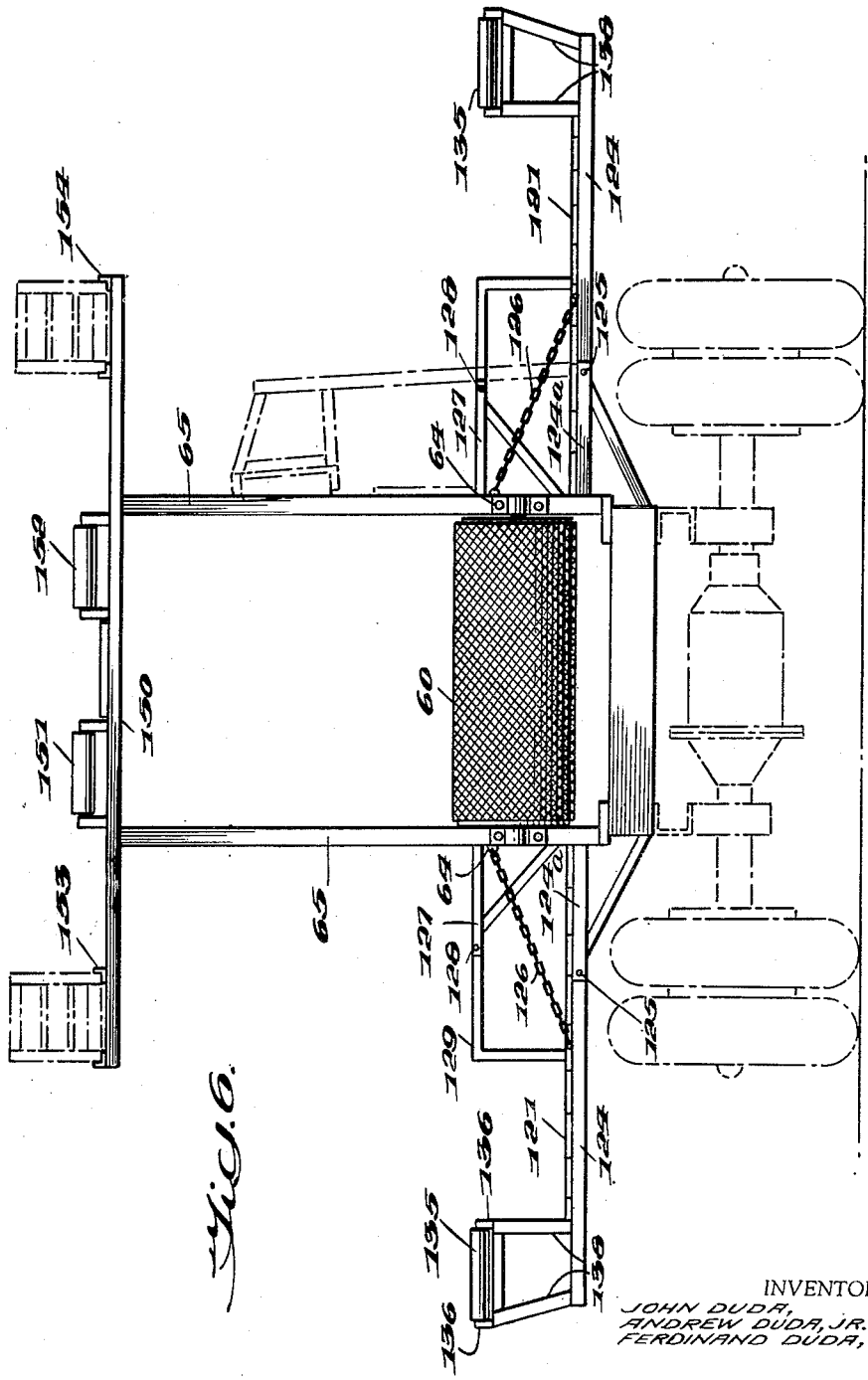

UNITED STATES PATENT OFFICE 2,647,525

APPARATUS FOR HARVESTING CROPS

John Duda, Andrew Duda, Jr., and Ferdinand Duda, Oviedo, Fla., assignors to A. Duda & Sons, Oviedo, Fla., a partnership Application December 11, 1950, Serial No. 200,299

15 Claims. (Cl. 134—63)

This invention relates to improved apparatus for celery harvesting. It is more particularly concerned with apparatus of this type, preferably self-propelled, for harvesting, processing and packing celery into crates ready for pre-cooling and shipment to markets.

It is well known to those skilled in the art of gathering celery in the field that considerable time and effort and the employment of large forces of workmen have normally been required to harvest the average celery crop and prepare it for shipment to markets. Moreover, the gathering of the crop has involved the handling and rehandling of large numbers of relatively small crates commonly referred to as field boxes.

Thus, in accordance with the conventional mode of harvesting celery, as heretofore carried out, workmen in the field, commonly called strippers or cutters, pull or cut the celery, trim off undesired limbs and pile it in piles for loading into field boxes. The cut celery is placed in the field boxes, topped therein to the desired length, usually about sixteen inches, and the filled boxes lined up in rows and loaded on trucks driven between the rows. The trucks carry the filled boxes to a wash house where they are unloaded, carried into the wash house on hand trucks and emptied onto tables. From the tables the celery is placed on a conveyor which carries it through a washer and then to the graders and packers. The latter grade and pack the washed celery in shipping crates which are then closed and fastened ready for precooling and shipment to markets.

In the conventional method above described the celery must be handled a large number of times before it is finally packed in crates ready for shipment. This increases the possibility of bruising and breaking the celery with consequent reduction in yield and inferiority of product. Furthermore, the use of a wash house which in and of itself is a costly undertaking, entails the additional expense of providing field boxes, together with transportation and personnel to crate, load and transport the cut celery from the field to the wash house for further processing.

A primary object of the invention is the provision of apparatus for harvesting crops whereby the complete operations of harvesting, processing and packing into crates for precooling and shipment to markets may be accomplished on a single machine in the field, thereby eliminating the costly installations of washing and packing houses together with field boxes, reducing handling and transportation costs and providing a better product.

A further object of the invention is the provision of apparatus for harvesting celery which will enable the operations of harvesting and preparing celery for shipment to be carried out with less personnel, higher yields and better quality of products than with conventional methods.

A still further object of the invention is to reduce the number of handlings to which celery is subjected in present conventional methods of harvesting celery together with the risk of damage caused by bruising and breaking inherent in such methods of handling, thereby insuring bigger yields to the grower and a fresher and better product to the consumer.

Another object of the invention is the provision of a self-propelled machine for harvesting celery wherein the machine and all power operated elements thereof are driven by a single engine or power plant through a plurality of transmissions.

Still another object of the invention is the provision of a machine for harvesting celery wherein means are provided for topping and washing the celery and for conveying the washed celery to a packing station where it is graded and packed into crates. An auxiliary object of the invention is the provision of means for filtering the wash water whereby it may be used over and over again with consequent saving in operating costs.

These and other objects of the invention will appear to persons skilled in the art from a consideration of the accompanying drawings and annexed specification illustrating and describing a preferred embodiment of the invention.

In the drawings:

Fig. 1 is a side elevational view of the improved harvesting machine of the invention;

Fig. 2 is a plan view of the machine with the top or roof portion removed;

Fig. 3 is a plan view of the chassis of the machine;

Fig. 4 is an enlarged view in side elevation of the front portion of the machine;

Fig. 5 is an enlarged fragmentary view in front elevation of the machine;

Fig. 6 is an enlarged view in rear elevation of the machine; and

Fig. 7 is an enlarged fragmentary view in plan of a portion of the front of the machine.

In general the device of the invention comprises a harvesting machine, preferably self-propelled, provided with an arrangement of collecting, delivery and discharge conveyors for collecting cut celery and delivering it to a packing station where it is graded and packed into crates and the filled crates placed on a discharge conveyor for movement to a central closing and fastening station at the rear of the machine. Means are provided for topping and washing the celery during its movement through the machine so that when graded and packed into crates and the crates closed and fastened it is ready for precooling and shipment to market.

Referring to the drawings for a more detailed description of the invention, the numeral 1 designates the chassis of the machine on which is mounted a pair of laterally extending side collecting conveyors 25 and a central grading and packing delivery conveyor 60. The chassis 1 is formed with side frame members 2 connected by suitable cross members 3 and having extensions 4 and 5 at their front and rear ends, respectively, for a purpose hereinafter described.

A motor 6 is mounted on the chassis 1 adjacent the forward end thereof and has driving connection with a six wheel tandem drive 7 through a plurality of transmissions 8, 9 and 10 and differentials 11, 12, 13. The transmissions 8, 9 and 10 are mounted in series directly behind the motor 6 and have their shift levers arranged so as to be conveniently accessible to the driver of the machine who sits on a seat 14 at one side of the chassis 1. The rear transmission 10 has suitable driving connection with the differentials 11, 12 and 13, through universals 15 and 16, propeller shafts 17 and 18 and the gears in gear boxes 19 and 20.

The arrangement provided gives a wide range of speeds from about 2 feet per minute up to about 35 miles per hour or more with adequate power throughout the entire range thereby enabling the machine to be operated at relatively low speeds in the fields to be harvested and at suitable higher speeds on highways and roads. In order to obtain flotation and increased traction in soft muds-type soils airplane type tires are preferably used throughout on all wheels.

The side conveyors 25 each comprise a framework 26 made up of side frame members 27 and 28 connected together by suitable cross-members. Belt rollers 29 and 30 are journalled in the side frame members 27 and 28 at opposite ends of the framework 26 and support thereon a continuous conveyor belt 31 of any suitable type and material such as leather or the like.

The side conveyors 25 extend laterally outward adjacent the front and on opposite sides of the chassis 1 and are pivotally mounted in bearings 32 secured to uprights 33. The uprights 33 are secured to the extensions 4 of the chassis side frame members 2 and suitably joined by cross-members 34 to form a substantially rectangularly shaped framework 35. The bearings 32 are preferably detachably mounted on the uprights 33 as shown in order that the side conveyors 25 may be readily detached when it is desired to run the machine along a highway or road.

Intermediate the ends thereof the side conveyors 25 are provided with supporting wheels 36 suitably suspended beneath the framework 26 by supporting arms 37 and desirably provided with airplane type pneumatic tires 38. The wheels 36 are desirably positioned inwardly of the ends of the conveyors 25 so as to support a major portion of the weight thereof and are permitted to follow uneven contours of the ground by virtue of the pivotal connection of the framework 26 with the uprights 33. In order to maintain the conveyors 25 in proper alignment and minimize any tendency for them to swing rearwardly thereby subjecting the pivotal connection to undue strain, radius rods 37a are provided. Each of these is pivotally connected at its outer end to the framework 26 and at its inner end to the side frame members 2 of the chassis 1.

To permit operation of the machine adjacent obstacles such as fences or small buildings, means are provided for raising the conveyors 25 about their pivotal connections with the upright 33 to clear such obstacles. These means preferably comprise a pair of cables 38a having their free ends secured to crosspieces 39 and shafts 40 respectively mounted on the framework 26 and having their intermediate portions threaded around pulleys 41 and 42 mounted, respectively, adjacent the ends of the conveyors 25 and adjacent the top of the framework 26. The shafts 40 are provided with handles 43 on the ends thereof for rotating them and with ratchet gears 44 adapted to cooperate with pawls 45 to hold the shafts against rotation in one direction. When it is desired to raise the conveyors 25, the shafts 40 are rotated in the proper direction by means of the handles 43. This causes the cables 38a to be wound on the shafts 40, thus shortening the intermediate looped portions and functioning through the pulleys 41 and 42 to raise the conveyors about their pivotal connections with the uprights 33.

As shown more clearly in Figs. 3, 4 and 5 the conveyor belts 31 are driven by the motor 6 through suitable driving connections between the inner belt rollers 29 and a countershaft 46 rotatably mounted on one of the side frame members 2 and driven by a chain and sprocket drive 47 from a shaft 48 of the transmission 9. Such driving connections may comprise a shaft 49 rotatably connected to the countershaft 46 by shaft 50 and universals 51 and having driving connection with one of the belt rollers 29 through a system of chains, sprockets and gears 52 mounted on one side of the framework 35 and with the other belt roller 29 through a system of chains and sprockets 52a mounted on the opposite side of the framework 35. As will be clearly evident from Figs. 4 and 5 of the drawing without further detailed description the arrangement provided is such that the belt rollers 29 are rotated in opposite directions whenever the countershaft 46 is rotated and these in turn move the conveyor belts 31 in a direction such that the upper runs thereof travel inwardly toward the chassis of the machine.

During operation of the machine in a field workmen, commonly called strippers, place themselves in position behind the side conveyors 25 and move forward on foot with the machine. During such movement they will pull or cut the celery, trim off undesired limbs, and then place the stalks on the conveyor belts 31 with the tops forward. The conveyor belts then move it inwardly for discharge onto the packing and grading belt 60.

During such inward movement of the celery on the conveyor belts 25 means are provided for topping or cutting the celery to a desired length which is usually about sixteen inches. Such means desirably comprises toothed blades or saws 53 rotatably mounted at the forward edges of the conveyors 25 adjacent the inner ends thereof and disposed in the paths of the celery tops. The saws 53 are rotated in the direction of the arrows shown in Fig. 5 so that the teeth thereof engage and cut the celery tops as they move downwardly and outwardly. Such rotation may be imparted to one of the saws 53 by a direct chain and sprocket drive 54 from the shaft 49. Rotation of the other saw 53 in the opposite direction is accomplished by a chain and sprocket drive 55 from a shaft 56. The shaft 56 carries a sprocket 57 which meshes with a chain 58 drivingly-connecting the chain and sprocket system 52a with the shaft 49. Thus, as the celery stalks are conveyed inwardly on the conveyor belts with the tops forward, the rotating saws 53 cut the stalks of celery to the desired length. The top portions thus removed fall to the ground, thereby eliminating the need for further handling and disposal of these waste portions. The topped celery then moves inwardly and is discharged onto the grading and packing or delivery belt 60.

The grading and packing or delivery belt 60 extends from front to rear of the machine and preferably comprises a chain link or mesh type belt made of angularly extending interconnected wires so arranged as to form substantially diamond shaped openings therebetween. The belt 60 is supported at the front and rear ends thereof by belt rollers 61 and 62. The roller 61 is rotatably mounted in bearings 53 secured to the under surfaces of the side frame member extensions 4 adjacent the front ends thereof. The roller 62 is rotatably mounted in bearings 64 secured to roof uprights 65 which extend upwardly from the chassis 1. The roller 62 is the driving roller for the belt 60 and for this purpose has driving connection with the countershaft 46. Such driving connections may desirably comprise cooperating bevel gears 66 mounted on the countershaft 46 and a drive shaft 67, the latter being provided with a sprocket 68. The sprocket 68 is connected by a chain 69 to a sprocket 70 mounted on the shaft 71 of the roller 62.

By virtue of these connections the belt roller 62 is rotated whenever the countershaft 46 is rotated. The roller 62 in turn effects movement of the belt or chain 60 preferably through frictional engagement therewith although other driving means, such as sprockets mounted on the shaft of the belt roller and cooperating with chains secured to the edges of the belt or with openings formed in the edges of the belt, may be used if desired.

Adjacent the front of the machine the upper run of the belt 60 has a rearwardly and upwardly inclined portion 74 (Fig. 4) which extends from the front roller 61 to a guide roller 75 rotatably secured to uprights 76 mounted on the chassis 1 on opposite sides of the engine 6. Rearwardly of the guide roller 75 the upper arm of the belt extends substantially horizontally into and through the washer and thence over additional guide rollers as required to the rear roller 62.

The lower run of the belt likewise extends rearwardly and upwardly from the front roller 61 to a guide roller 78 rotatably mounted on inclined frame members 79 secured to the chassis of the machine. The lower run of the belt passes over the guide roller 78 and then rearwardly over additional guide rollers 80 to the rear roller 62. The rollers 78 and 80 are so positioned as to guide and support the lower run of the belt above the engine 6 and the water storage tank hereinafter described.

The washer 85 comprises a tank 86 mounted on the uprights 65 and 76 and having a plurality of spray heads 87 mounted therein above and below the upper run of the conveyor belt 60 for directing a plurality of sprays of water under pressure downwardly and upwardly against the stalks of celery carried by the belt. Water under pressure is supplied to the spray heads 87 by a pump 88 which withdraws it from a storage tank 89 and forces it through conduits 90 and 91 to the sprays. The storage tank 89 is mounted on the chassis 1 below the lower run of the belt 60 and is of sufficient capacity to supply the required washing water during operation of the machine.

The pump 88 (Fig. 3) may be driven by a sprocket 92 mounted on a shaft 93 extending from transmission 8 and having driving connection through a chain 94 with a sprocket 95 mounted on the shaft 96 of the water pump. This arrangement whereby the pump is driven from the first transmission 8 gives maximum speed of rotation for building up the pressure of the water supplied to the spray heads.

The wash water from the sprays together with the debris which has been washed from the celery fall to the bottom of the wash tank 86 and drain therefrom into a filtering tank 97. The tank 97 is positioned alongside and somewhat below the bottom of the washer and is provided with a fine mesh screen 98 arranged transversely thereof and through which the water passes downwardly to a drain pipe 99 discharging into the water storage tank 89. The screen 98 is preferably of the continuous belt type comprising an endless screen belt mounted on rollers 101 and 102 and inclined upwardly out of the tank for the discharge of solid material filtered from the wash water. A rotating brush 103 is mounted above and at the discharge end of the screen to assist in cleaning it and dislodging solid materials therefrom. Such solid material removed by the screen is discharged on the ground thereby eliminating the need for further disposal thereof.

Continuous movement may be imparted to the screen 98 through a suitable chain and sprocket or belt and pulley connection 104 between the shaft of roller 102 and the shaft of a guide roller 105 engaged by the lower run of the belt. The brush 103 may be mounted on the shaft of the guide roller 75 for rotation therewith. This insures an effective wiping and cleaning action so that all debris carried upwardly out of the tank is removed from the screen and discharged on the ground.

The front and rear ends of the washer tank 86 are provided with opposed openings through which the upper run of the conveyor 60 enters and leaves the washer. These openings may desirably be covered, at least in part, by canvas flaps or the like and to minimize loss of wash water from the spray heads. Guards or shields 111 and 112 are also desirably provided extending from the ends of the washer at the sides of the open portions. The guards 111 desirably extend downwardly on each side of the rearwardly and upwardly inclined portion 74 of the upper conveyor run to points adjacent the discharge ends of the collecting conveyors 25. They may be removably mounted in position on the inclined frame members 79 if desired. The guards 112 extend rearwardly from the washer into engagement with side guard rails 113 arranged on either side of the upper conveyor run and extending to points adjacent the rear roller. The guards 111 and 112 and guard ralis 113 insure that the celery discharged onto the conveyor belt 60 from the collecting conveyors 25 is retained thereon until removed at the packing station as hereinafter described.

In passing through the washer the celery is thoroughly washed by the pressure sprays, the wash water filtered and returned to the storage tank for reuse, and the solids filtered from the water discharged on the ground. The washed celery is then conveyed on the conveyor belt to the packing station 120 where workmen, called packers, grade and remove the stalks of celery and pack them into crates. The packers stand on platforms 121 in packing stalls 122 located between packing stands 123. The platforms 121 are supported on arms 124 hinged to extensions 124a of the framework of the machine, as at 125, and suspended in position by the chains 126. The chains 126 are secured to the supporting arms 124 and to the uprights 65 and serve to support the platform in substantially horizontal position when the machine is operating in a field. When it is desired to drive the machine along a highway the hinged connections 125 permit the arms 124 and the platform to be folded upwardly and inwardly toward the body of the machine, as shown in broken lines in Fig. 6, and secured in this position in any suitable manner.

The packing stands 123 are designed to support the crates or boxes into which the celery is packed and are spaced along the packing belt on either side thereof so that the packers may stand between them for ready access to the belt. Each of the stands 123 comprises an inner portion 127 secured to the framework of the machine and hingedly connected at 128 to an outer portion 129 which rests on the platforms 121. The hinged connection 128 between the inner and outer portions permits the stands to fold simultaneously with the folding inwardly of the platforms 121.

The packers remove the topped and washed celery from the belt 60 and pack it into crates resting on the packing stands 123, grading the celery as they do so. The packers then lift the packed crates and deposit them on conveyors 135 on which they move to the rear of the machine.

The conveyors 135 preferably are of the roller bed gravity type and are located adjacent the outer side edges of the platforms in spaced relation to the ends of the packing stands so as to leave a walkway therebetween for the workmen. The roller beds are desirably inclined downwardly toward the rear of the machine to facilitate gravity movement of the crates therealong. Each of the roller beds 135 comprises a pair of side frame members 136 having a plurality of rollers 137 rotatably mounted therein and supported above the platform by uprights 138 secured to the outer ends of the arms 124.

The packed crates of celery move rearwardly on the roller beds 135 and are discharged on inwardly curving gravity roller beds 140 on which they move to a centrally located closing and fastening platform 141 at the rear of the machine. The roller beds 140 comprise curved side frame members 142 suitably supported on the framework of the machine and carrying a plurality of shafts 143 on which are mounted roller wheels 144. Each of the shafts 143 carries a plurality of the roller wheels, for example two, spaced along the shafts 143 so as to support the crates. To assist in guiding the crates along the roller beds 140 guide rails 145 are secured along the outer edges thereof and project upwardly therefrom around the curved portions of the tracks. As the crates roll off the roller beds 135 onto roller beds 140, they are guided along the latter by the guide rails 145 to the platform 141.

The platform 141 is mounted on rearward extensions 5 of the chassis in a position adjacent the body of a trailer truck or the like pulled by the machine. The crates are closed and fastened on the platform 141 by a workman who stands on a platform 146 mounted on the extensions 5 inwardly of and below the platform 141.

The fastened crates are removed from the platform 141 and loaded on the trailer truck which is being towed behind the harvesting machine. When the trailer is loaded it is replaced by another truck which has brought knock-down crates. These are transferred to the harvesting machine, assembled, and then disposed so as to be readily accessible to the packers.

To facilitate the assembly and disposition of knock-down crates the machine is provided with a roof member 150 suitably covered and supported above the conveyor belt 60 by the uprights 65. The uprights 65 may be mounted on any convenient part of the chassis such as the side frame members 2. The roof member 150 carries thereon a pair of roller beds 151, 152 arranged centrally thereof and a pair of crate chutes 153, 154 arranged outwardly of the roller beds. Platforms 155 and 156 are mounted at each end of the roof member and serve to support the workmen who load, assemble, and position the crates. Thus the rear platform 155 supports a workman who stacks the knock-down crates on the roller beds 151, 152, and pushes them toward the front end of the device where they can be reached by a workman standing on the platform 156. The workmen then assemble the knock-down crates, place them in the crate chutes 153, 154 and push them along the chutes so that they can easily be reached by the packers standing below.

Briefly described, the operation of the machine is as follows: As the machine is driven through the fields to be harvested, workmen follow along behind the side, collecting conveyors 25 pulling or cutting the celery, trimming it, and then placing it on the conveyor belts 31 with the tops forward. The speed of the machine may be varied as desired by the driver to accommodate it to the speed with which the celery is being cut or pulled.

The conveyor belts 31 move the celery inwardly past the toppers or saws 53 which cut it to the desired length. It is then discharged onto the upper run of the delivery belt 60 which carries it upwardly between the side shields 111 into and through the washer 85. While passing through the washer, the celery on the conveyor belt is thoroughly cleaned by high pressure sprays of water directed thereon from above and below the belt by the sprays 87. The wash water drains from the wash tank into the filter tank 97, is filtered through the continuously moving screen 98 and then returned to the storage tank 89 for reuse. The solid material filtered out of the water is discharged on the ground.

The belt 60 conveys the washed celery toward the rear of the machine to the packing stations 120 where rows of packers, positioned on either side of the belt, grade and pack the celery into crates supported on the crate stands 123. When the crates are filled the packers place them on the roller beds 135 on which they roll to the roller beds 140 and thence to the rear platform 141 where they are closed, fastened and loaded on the trailer truck pulled by the harvesting machine. As the crates are filled and removed from the packing stands, they are replaced by empty crates taken from the crate chutes 153 and 154 above by the packers. The empty crates are then replaced by the workmen standing on the platforms 155 and 156 as hereinbefore described.

It will thus be apparent that the present invention provides an improved machine for harvesting celery which has many advantages over previous machines and devices for this purpose. Thus it is self-propelled so that it may move to any field under its own power. All control levers are readily accessible from the driver's seat to permit operation by one man. One motor drives all units and propels the machine at road speeds of up to 35 miles per hour, and operating speeds as low as 2 feet per minute with ample power at all speeds.

The device of the invention is so constructed that it can be driven any place a truck will go. For this purpose the side conveyors may be removed and the roller beds, packing stands and walkways folded up bringing it within the 8 feet maximu road width. The side conveyors can also be raised by crank and cable, enabling them to pass over a fence, small buildings or other obstruction encountered in the field.

Use of the machine eliminates the need for wash houses and field crates since it permits the complete operations of harvesting, processing and packing celery to be carried out in the field. Incidental to this is a saving of as much as 30% of the hauling expense by virtue of discharging all waste in the field. Use of the invention also eliminates several handlings of the celery thereby reducing bruising and breakage and thus insuring a bigger yield to the grower and a fresher and better product to the consumer.

Use of the machine further reduces the number of workers required to produce a given rate of production. Thus the prior conventional method outlined hereinabove requires some 68 workers to cut, process and pack 150 crates of celery per hour. Using the device of the invention, 54 workers attain the same rate of production with a better quality of product. This represents a reduction in personnel of about 21%.

Although we have illustrated and described a preferred embodiment of the invention with particular reference to its application in harvesting celery, we do not intend to be limited to such application or to the details of construction given as the scope of the invention is best defined in the appended claims.

We claim:

1. Celery harvesting apparatus comprising a mobile chassis, power-driven oppositely disposed belt collecting conveyors mounted on said chassis adjacent one end thereof extending laterally outwardly therefrom, said collecting conveyors belts being substantially flat and adapted to have picked celery placed thereon for delivery inwardly to said chassis for discharge, a power-driven endless belt delivery conveyor mounted on said chassis and extending longitudinally thereof having a receiving end portion, said collecting conveyors having inwardly disposed portions located immediately adjacent the receiving end portion of the delivery conveyor to discharge celery directly thereto, said delivery conveyor belt being substantially flat and adapted to move celery longitudinally of said chassis, workmen's packing stations including packing platforms mounted on said chassis and disposed adjacent said delivery conveyor and extending laterally thereof along the run thereof and to which the delivery conveyor delivers celery from the collecting conveyors for packing into containers at the packing stations, washer means positioned over the delivery conveyor intermediate said packing stations and said collecting conveyors for washing the celery as it is carried by said delivery conveyor toward said packing stations, said washer means including washing liquid projectors arranged adjacent of said delivery conveyor for directing washer liquid against celery carried thereby and a receiver for collecting liquid from beneath said delivery conveyor for re-use in washing celery.

2. Celery harvesting apparatus as set forth in claim 1 wherein the delivery conveyor is a foraminous belt through which washing liquid will drain into the liquid receiver of the washer.

3. Celery harvesting apparatus as set forth in claim 1 further including a separate washing liquid storage tank mounted on the chassis rearwardly of said washer and liquid conducting means interconnecting the liquid receiver and said storage tank.

4. Celery harvesting apparatus as set forth in claim 1 further including a power unit mounted on the mobile chassis for propelling said chassis, and power-transmitting means for driving the collecting conveyors and the delivery conveyor from said chassis propelling power unit.

5. Celery harvesting apparatus as set forth in claim 1 including horizontal discharge conveyor means mounted on and extending longitudinally of said chassis laterally outwardly of said packing stations for moving packed celery containers to a discharge station.

6. Celery harvesting apparatus as set forth in claim 5 wherein there are packing stations including packing platforms disposed adjacent both sides of the delivery conveyor extending laterally thereof, and including discharge conveyor means mounted on and extending longitudinally of the chassis disposed laterally outwardly of the packing stations on both sides of the chassis, a discharge platform mounted on the chassis longitudinally outwardly of the far end of the delivery conveyor, and laterally inturned extensions of the discharge conveyors, each adapted to discharge packed celery containers to said discharge platform.

7. Celery harvesting apparatus as set forth in claim 5 in which said packing stations and discharge conveyor means are disposed on horizontal supporting platform means which extend longitudinally of said chassis and project laterally outwardly therefrom pivotally mounted on the chassis so as to be foldable upwardly and inwardly about longitudinal axes to vertical positions to facilitate movement of said apparatus in transit.

8. Celery harvesting apparatus comprising a mobile chassis, power-driven oppositely disposed belt collecting conveyors mounted on said chassis adjacent one end thereof and extending laterally outwardly therefrom, said collecting conveyors belts being substantially flat and adapted to have celery placed thereon for delivery inwardly to said chassis for discharge, a power-driven belt delivery conveyor mounted on said chassis and extending longitudinally thereof, said delivery conveyor extending horizontally at a level higher than said collecting conveyors over a major portion of its length and having a receiving end portion inclining upwardly from the inner end portions of said collecting conveyors to the level of the horizontal portion of the delivery conveyor, the inner end portions of said collecting conveyors being disposed immediately adjacent the receiving end portion of the delivery conveyor to discharge celery directly onto the delivery conveyor, the delivery conveyor belt being substantially flat and adapted to receive celery discharge from the collecting conveyors and to move it upwardly longitudinally of said chassis to said horizontal portion of the delivery conveyor, workmen's packing stations including packing platforms mounted on said chassis adjacent said horizontal portion of the delivery conveyor extending laterally outwardly therefrom and to which celery is delivered for packing into containers, a washer disposed over the delivery conveyor located intermediate the upwardly inclining receiving end portion of said delivery conveyor and said packing stations for washing celery as it is carried by said delivery conveyor toward said packing stations, said washer including washing liquid projectors arranged adjacent said delivery conveyor for directing washing liquid against celery carried thereby, and a receiver for collecting liquid from beneath said delivery conveyor for re-use in washing celery.

9. Celery harvesting apparatus comprising a mobile chassis, oppositely disposed belt collecting conveyors mounted on said chassis adjacent one end thereof and extending laterally outwardly therefrom, said collecting conveyors belts being substantially flat and adapted to have celery placed thereon for delivery inwardly to said chassis and discharge therefrom, a belt delivery conveyor mounted on said chassis and extending longitudinally thereof and having a receiving end portion, the inner end portions of said collecting conveyors being disposed immediately adjacent the receiving end portion of the delivery conveyor to discharge celery directly thereto, said delivery conveyor belt being substantially flat and adapted to receive celery thereon and to move celery longitudinally of said chassis, workmen's packing stations mounted on said chassis and disposed adjacent said delivery conveyor extending outwardly thereof and to which the delivery conveyor delivers celery from the collecting conveyor for packing into containers at said packing stations, and washing apparatus mounted on said chassis, said washing apparatus comprising a water reservoir and means for discharging water from the reservoir on the celery on said delivery conveyor prior to delivery of the celery to said packing stations.

10. Celery harvesting apparatus as set forth in claim 9 wherein the washing apparatus includes a water-collecting tank located below the delivery conveyor and power-driven pump means for circulating water from the reservoir to the water-discharging means.

11. Celery harvesting apparatus as set forth in claim 9 wherein the washing apparatus includes means for collecting and filtering dirty water after washing of celery on the delivery conveyor for return in clarified condition to the reservoir, and power-driven pump means for circulating water from the reservoir to the water-discharging means.

12. Celery harvesting apparatus according to claim 9 wherein the delivery conveyor is foraminous and the means for discharging water include power-operated water spray elements arranged above and below said foraminous delivery conveyor, all said spray elements being adapted to discharge water from the reservoir on the celery on the delivery conveyor.

13. Celery harvesting apparatus comprising a self-propelled mobile chassis, power-driven oppositely disposed belt collecting conveyors mounted on the chassis at the front end thereof and extending laterally outwardly therefrom, said collecting conveyors belts being substantially flat and adapted to have picked celery placed thereon for delivery inwardly to said chassis for discharge from said conveyors, a power-driven horizontal belt delivery conveyor mounted on said chassis extending longitudinally rearwardly from the front end thereof, said delivery conveyor having a receiving end portion disposed immediately adjacent the inner end portions of said collecting conveyors, said collecting conveyors discharging celery directly to said receiving end portion of the delivery conveyor, said delivery conveyor belt being substantially flat and adapted to move celery rearwardly longitudinally of said chassis, washing means mounted on said chassis rearwardly of said receiving end of said delivery conveyor and adapted to wash celery moving on said delivery conveyor, and workmen's packing stations including packing platforms mounted at longitudinal intervals on said chassis rearwardly of said washing means, said packing stations being disposed adjacent said delivery conveyor and extending laterally outwardly thereof for collecting celery therefrom and packing celery into containers at said packing stations.

14. Celery harvesting apparatus according to claim 13 further including an overhead packing container conveyor mounted on the chassis and extending longitudinally thereof above the delivery conveyor adapted to deliver packing containers to the packing stations from the rear end of said chassis.

15. Celery harvesting apparatus according to claim 13 further including an overhead packing container conveyor mounted on the chassis and extending longitudinally thereof above the delivery conveyor adapted to deliver packing containers to the packing stations from the rear end of said chassis, and discharge conveyor means mounted on said chassis laterally outwardly of said packing stations and adapted to carry packed celery containers from said packing stations rearwardly for discharge at the end end of said chassis.

JOHN DUDA.
ANDREW DUDA, Jr.
FERDINAND DUDA.

References Cited in the file of this patent

UNITED STATES PATENTS

| Number | Name | Date |
|---|---|---|
| 1,465,190 | Stewart | Aug. 14, 1923 |
| 1,756,653 | McArthur | Apr. 29, 1930 |
| 1,932,827 | Morris | Oct. 31, 1933 |
| 2,010,497 | Skinner | Aug. 6, 1935 |
| 2,179,868 | Stebler | Nov. 14, 1939 |
| 2,262,607 | Hoon | Nov. 11, 1941 |
| 2,310,358 | Emmons | Feb. 9, 1943 |
| 2,321,387 | Jackson | June 8, 1943 |